Jan. 22, 1929.
S. C. BARNES
1,699,518
TIRE CARRIER
Filed Oct. 26, 1927
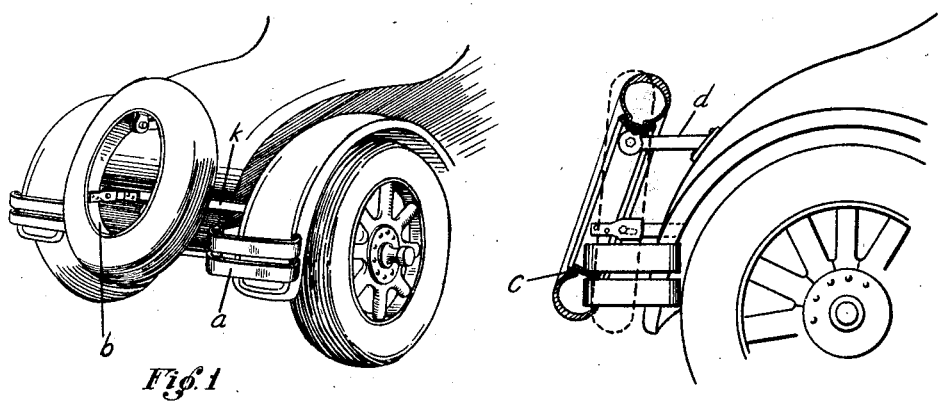
Fig. 1
Fig. 2
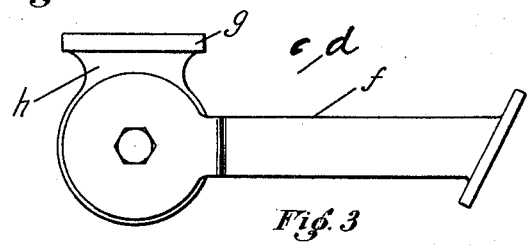
Fig. 3
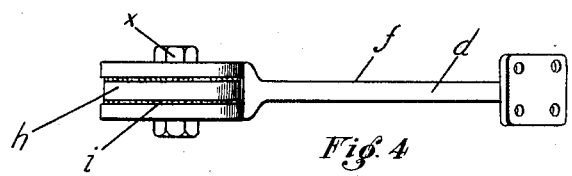
Fig. 4
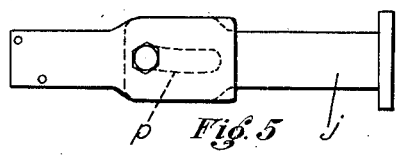
Fig. 5
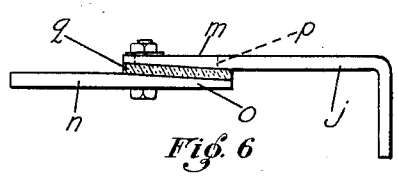
Fig. 6
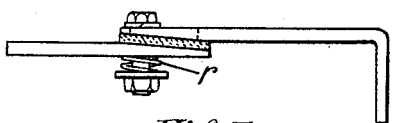
Fig. 7
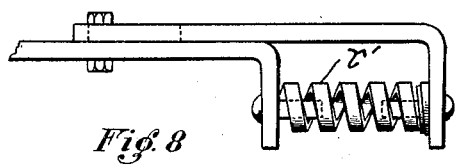
Fig. 8
INVENTOR.
BY Stuart C Barnes
ATTORNEY.

Patented Jan. 22, 1929.

1,699,518

UNITED STATES PATENT OFFICE.

STUART C. BARNES, OF DETROIT, MICHIGAN.

TIRE CARRIER.

Application filed October 26, 1927. Serial No. 228,891.

This invention relates to tire carriers. It embodies what is believed to be a broad and novel improvement in tire carrier construction, and it also involves a combinative relation with the rear quarter bumpers, whereby the tire carrier and tire cooperate with the rear quarter bumpers in defending them from serious injury.

The breaking and deforming of tire carriers has been a serious annoyance to motorists for years. Even with bumpers, tire carriers are often broken. Many bumpers are rather flimsy and when subjected to shock the impact goes clear through the bumper and is received by the spare tire. Where the spare tire or spare wheel is carried on a hub support at the center of the wheel, as is usually the case with a spare wheel, this is quite likely to fracture the hub support. This is especially true when the hub support is a casting, because the force of impact is greatly augmented by reason of the leverage in transmitting the force from the outside of the rim to the center of the wheel. Other forms of tire carriers which are better adapted to withstand the shock have nevertheless been often distorted or broken, even with the old style of bumpers.

With the introduction of the rear quarter bumpers, the tire and carrier were left entirely unprotected except from side blows. The result is that these carriers are often broken and are considerably distorted by reason of being bumped. It is the object of the present invention to so design the tire carrier that a certain amount of the shock can be relieved by dissipating energy, or by storing energy to be released when the impact ceases. It is a further object of the invention to so place this tire carrier that the cooperation of the large soft balloon tire is brought into play in relieving the shock, and also to so place the tire that it is calculated to relieve the rear quarter bumpers of many blows that they would otherwise receive.

In the drawings:

Fig. 1 is a rear perspective showing an automobile equipped with my improvement.

Fig. 2 is a fragmentary side elevation of a car showing the tire and rim in cross section, and showing in dotted lines how the spare tire may yields slightly under impact.

Fig. 3 is a side view of the upper tire carrying fixture.

Fig. 4 is a bottom view of the same.

Fig. 5 is a side elevation of one of the bottom fixtures.

Fig. 6 is a top plan view of the same.

Fig. 7 is a view of a slightly modified form of lower fixture.

Fig. 8 shows a modified form of resister.

$a$ designates the usual rear quarter bumpers which are now in common use; $b$ is the tire-carrying ring; $c$ the spare tire and rim. Inasmuch as practically all tires now used are balloon type, these are relatively large and project outwardly considerably from the rim. They are inflated at relatively low pressures, and consequently are an excellent shock absorber, provided the tire carrier is capable of withstanding the strains put upon it by reason of using the balloon tire to meet the impact of the blow. With my improvement it is possible to use the balloon tire to cushion the impact for, as hereinafter explained, the tire carrier is very much relieved of the strain.

The broad conception of permitting the parts of the tire to yield slightly either against the resistance of spring action, or in the presence of the dissipation of energy, may be carried out in numerous ways, as it will be evident after the disclosure of my plan of defending the rear of the car from blows and shocks.

However, I have adopted a specific embodiment of my plan, which I regard very effective to carry out my conception. Preferably I hinge the upper portion of the spare tire to the body by the upper fixture $d$. This fixture $d$ comprises an arm $f$ which may be secured to the body in any suitable way. Simply as a matter of illustration it is shown provided with an angle plate that can be bolted to the back of the body, but it will be preferable to anchor the end of the arm to some of the body frame members, so as to have a secure anchorage. A disk $h$ is provided with a flange $g$, by which it may be secured to the tire carrier. The arm $f$ is bifurcated at its end and straddles the disk $h$. Preferably a pair of friction washers $i$ of brake lining material are interposed between the bifurcations. These are clamped together by the bolt and nut $x$. This makes a strong friction hinge which interposes a relatively great resistance to movement, yet will permit movement under impact.

Two lower brackets are used. One of these is shown in Figs. 5 and 6. This comprises an arm $j$ which may be bolted to the cross bar $k$ or any other suitable anchorage. The end of this arm $j$ is provided with a slightly enlarged and bevel-faced friction head $m$. Likewise another arm $n$ is provided with a slightly enlarged and bevel-faced friction head $o$. One of these arms is provided with a segmental slot $p$, whose curve has its center, when the parts are assembled in place, at the center of the upper hinge. Preferably a friction material such as brake lining $q$ is interposed between the beveled faces of the arms $n$ and $j$. The incline of these beveled faces is somewhat exaggerated for the purpose of illustration. It may be varied down to zero or a straight surface.

It will be apparent that by reason of the slot $p$ the arms which are bolted together can slide along in overlapped relation, but this sliding is resisted by a very great amount of friction due to fairly tightly clamping the parts together with an interposed brake lining material. Furthermore, it will be obvious that the farther the two arms overlap each other the greater will be the amount of resistance due to the inclining of the face of the arms, so that they will have to compress the brake lining material which is of course somewhat compressible.

In Fig. 7, a somewhat modified form of construction is shown wherein the two arms are not held tightly together by a positive action, but by the aid of a strong spring $r$. The type of resistance introduced in Figs. 5 and 6 is primarily a dissipation of energy by means of friction, and in the form of heat. However, there is also a certain amount of energy stored as potential energy in the slight compression of the braking material. In Fig. 7 there is combined both the dissipation of energy in the form of heat, and the storing of energy in the spring. In Fig. 8 a heavy coiled spring resists the impact and stores energy. These are simply illustrations of types that may be introduced into a design of tire carrier for permitting its parts to yield under strain, and thus relieve the carrier of strain that is calculated to break or distort.

I prefer to relieve the strain by dissipating the energy in the form of heat, but it will be apparent that the strain may be relieved by simply storing the energy of the shock in springs, which will return the tire carrier parts to their original position when the impact has been relieved. The spring form has, of course, the advantage of assuming its original position upon relief from the shock, but has the disadvantage of requiring unusually heavy springs in order to be effective.

Referring to Fig. 2, it will be evident how my improved tire carrier, with a balloon tire, and the rear quarter bumpers, can all be gotten together in a new cooperative relation. A spare tire is carried with a slight tilt forward at the top. The balloon tire projects at the rear considerably beyond the rim, as is customary. It will also be noted that in my arrangement it is beyond the plane of the rear quarter bumpers, hence it is directly in the path of the ordinary shock which is received in traffic. By reason of the low inflation of a balloon tire, usually ranging from 30 to 40 pounds, the balloon tire has considerable cushioning effect in the way of distortion and storing the energy under the impact. Or the owner of the car may purposely carry the inflation in the spare very low, say 5–10 pounds, to act as a better cushion, while being used only as a spare. However, if the impact is a considerable one, the shock will be communicated to the rim and then to the tire carrier. However, as already explained, my tire carrier may pivot on the upper fixture and slide slightly on the lower fixture, but only with relatively large friction. Preferably the friction should be calculated to be only a comfortable margin below the breaking strain, or distorting strain, of the carrier parts, or their anchorage. This is simply an engineering problem.

From the tilt of the spare tire, as shown in the figure, it will be seen that a balloon tire will take considerable thrust without the impact being brought directly against the rim. Furthermore, a considerable resistance can be introduced against the shock before the spare tire in its relative movement moves forward in the plane of the bumpers, where the bumpers will be deformed under the shock. It will therefore be evident that not only does my improvement protect the spare tire carrier, but it also serves to in a measure protect the rear quarter bumpers, which are often permanently deformed and broken by blows.

In the claims, for the purpose of definiteness of reference, I have used the words "spare tire carrier" and referred more particularly to the spare tire carrier throughout. However, I desire it understood that these are words of description rather than limitation, and that these claims are intended also to cover spare wheel carrier, which, of course is in a broad sense a spare tire carrier as well.

What I claim is:

1. A spare tire carrier, having in combination means for supporting a tire, anchoring means for connection with the car, and means connecting the two said means and permitting relative movement in the presence of friction.

2. A tire carrier, having tire carrier parts and anchorage parts connected together to yield under relatively great resistance.

3. A tire carrier, having tire carrying parts and anchorage parts connected to yield under relatively great resistance, and with a dissipation of energy to protect the carrier.

4. A tire carrier, having tire carrying parts and anchorage parts connected together for limited relative movement resisted by friction.

5. A tire carrier, having tire carrier parts and anchorage parts connected together for relative movement, and friction material interposed on the surfaces that move by each other to resist such movement.

6. A tire carrier, comprising tire carrying parts and anchorage parts connected together to have relative movement, and means for resisting said relative movement comprising friction surfaces including inclined planes.

7. A tire carrier, comprising tire carrying parts and anchorage parts, and means for connecting the same together comprising sliding surfaces bolted together with interposed friction material.

8. A tire carrier, comprising tire carrying parts and anchorage parts connected together, and means for connecting them together comprising a pair of heads clamped together by a bolt passing through a slot.

9. A tire carrier, comprising tire carrying parts and anchorage parts connected together, means for connecting them together comprising a pair of heads clamped together by a bolt passing through a slot, and an interposed friction material between said heads.

10. A tire carrier, comprising tire carrying parts and anchorage parts connected together, means for connecting them together comprising a pair of heads clamped together by a bolt passing through a slot, and an interposed friction material between the heads of a compressible nature, and the said heads having inclined surfaces arranged to compress the friction material when the heads slide over each other.

11. A tire carrier, comprising an upper fixture arranged to support the tire and allowing a hinging action, a lower fixture arranged to support the tire and allowing the same to swing inwardly but in the presence of relatively great resistance.

12. A tire carrier, having an upper fixture arranged to support the tire but to allow a hinging action in the presence of relatively great friction, a lower tire carrying fixture having parts arranged to permit the lower end of the tire to swing on the upper hinge member but in the presence of relatively great friction.

13. A tire carrier, comprising an upper fixture, arranged to support the tire but allowing a hinging action, a lower tire carrying fixture having parts one of which is provided with a slot for the passage of a bolt, the said slot formed on a curve whose center is at the hinging point in the upper fixture, said parts being clamped together to permit the swinging of the lower portion of the tire but in the presence of relatively great resistance.

14. The combination of a vehicle having a pair of rear quarter bumpers, a spare tire carrier located therebetween slightly tilted forward at the top, a tire carried on said carrier, the tire and carrier being arranged so that at the lower portion of the tire and carrier the tire is tilted and exposed slightly beyond the plane of the rear quarter bumpers for the purpose of using the tire for cushioning the impact, and means for in turn permitting a yield of the tire and carrier.

15. The combination with a vehicle having a pair of rear quarter bumpers, a tire carrier, and a balloon tire, the tire carrier being located with respect to the rear quarter bumpers to support the balloon tire so that it projects at the rear beyond the plane of the rear quarter bumpers, and means for yieldingly supporting the tire carrying members to permit the same to move forward in the presence of relatively great resistance.

16. The combination of a vehicle having a pair of rear quarter bumpers, a tire carrying support located therebetween and tilted slightly forward at the top, the same arranged to carry a balloon tire so that the same projects slightly to the rear in the plane of the rear quarter bumpers at the bottom of the tire, and means for supporting the tire-carrying support on a vehicle but permitting relative movement thereof in the presence of relatively great friction.

17. The combination of a vehicle having a pair of rear quarter bumpers, a spare tire support located therebetween and tilted forward at the top and located to carry a tire with a low inflation pressure and so that the latter will project slightly beyond the plane of the rear quarter bumpers to the rear thereof, and means for supporting the tire support so that the same may hinge at the top but swing in at the bottom but in the presence of a relatively great resistance.

In testimony whereof I have affixed my signature.

STUART C. BARNES.